March 5, 1946.  L. R. SHAFFER  2,396,132
CULTIVATOR TOOL
Filed Oct. 8, 1942    4 Sheets-Sheet 1

Inventor
Larkin R. Shaffer
By Clarence A. O'Brien
and Harvey B. Jacobson
Attorneys

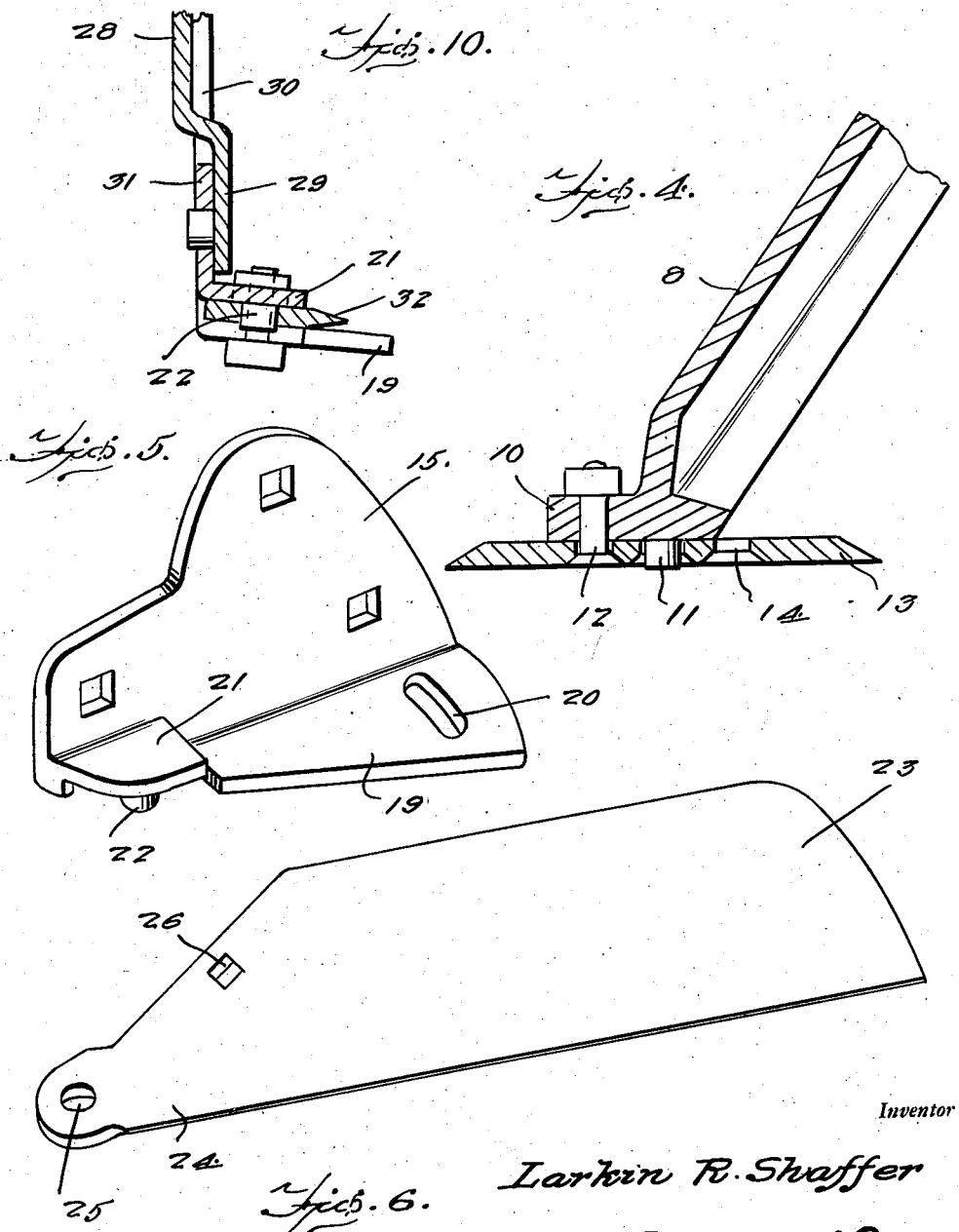

March 5, 1946.    L. R. SHAFFER    2,396,132
CULTIVATOR TOOL
Filed Oct. 8, 1942    4 Sheets-Sheet 3

Inventor
Larkin R. Shaffer
By Clarence A. O'Brien
and Harvey B. Jacobson
Attorneys

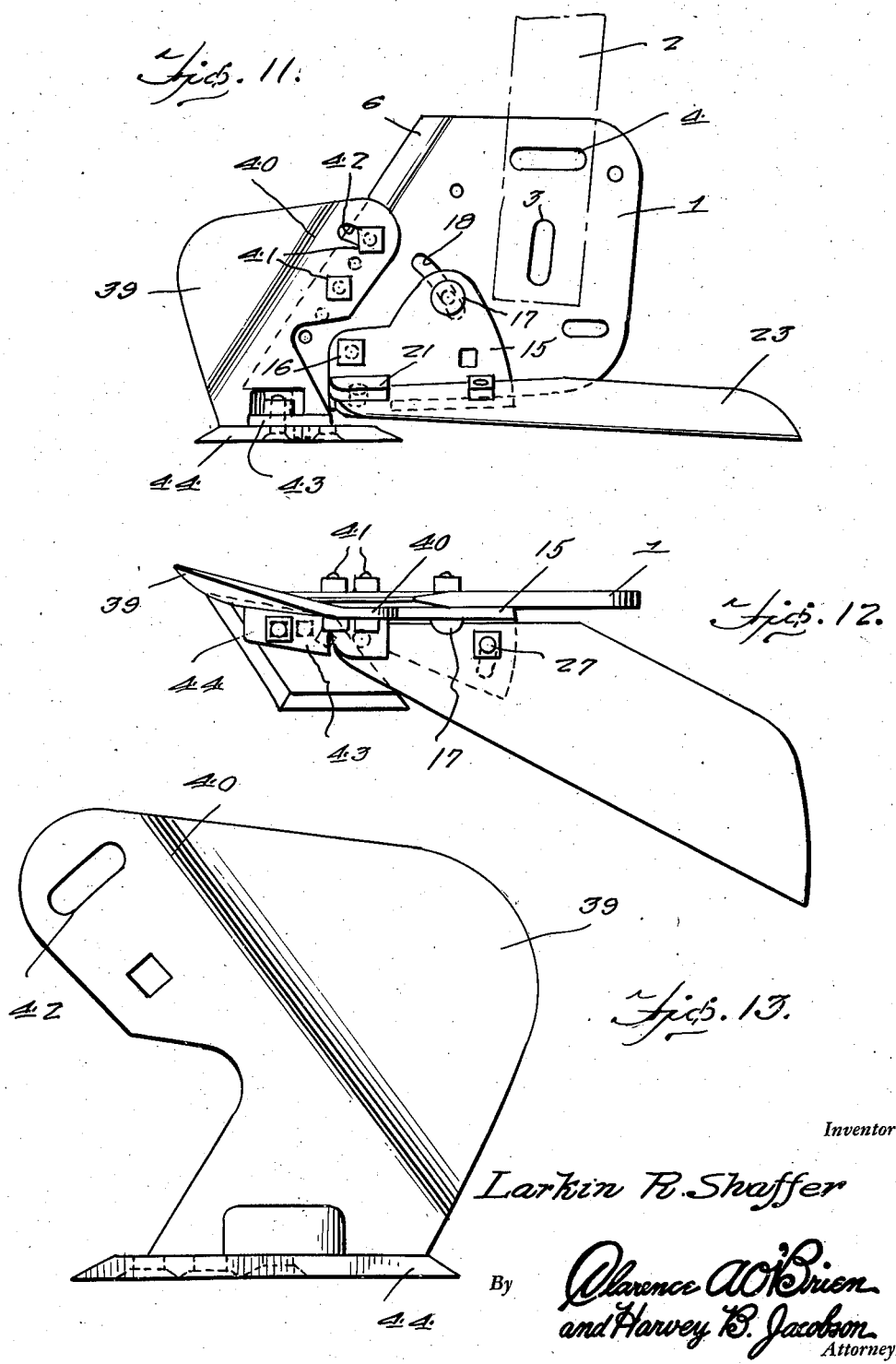

Patented Mar. 5, 1946

2,396,132

UNITED STATES PATENT OFFICE 2,396,132

CULTIVATOR TOOL

Larkin R. Shaffer, Garland, Utah

Application October 8, 1942, Serial No. 461,299

8 Claims. (Cl. 97—205)

The present invention relates to new and useful improvements in tools for row crop cultivators, and has for its primary object to provide, in a manner as hereinafter set forth, a novel construction, combination and arrangement of earth working elements, whereby various cultivating operations may be expeditiously performed.

Another very important object of the invention is to provide a set of cultivator tools of the aforementioned character which are adapted to be conveniently adjusted as desired to meet different conditions.

Other objects of the invention are to provide a set of cultivator tools of the character described which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 4 is a view in vertical section through the lower portion of the digger.

Figure 5 is a perspective view of one of the sweep brackets.

Figure 6 is a perspective view of one of the sweeps.

Figure 10 is a detail view in vertical section, taken substantially on the line 10—10 of Figure 7.

Figure 11 is a view in side elevation of an arrangement which is particularly adapted for cutting hard earth crust and grass up close to the row.

Figure 12 is a top plan view of the arrangement shown in Figure 11.

Figure 13 is a view in side elevation of the crust cutting implement.

Figure 1:
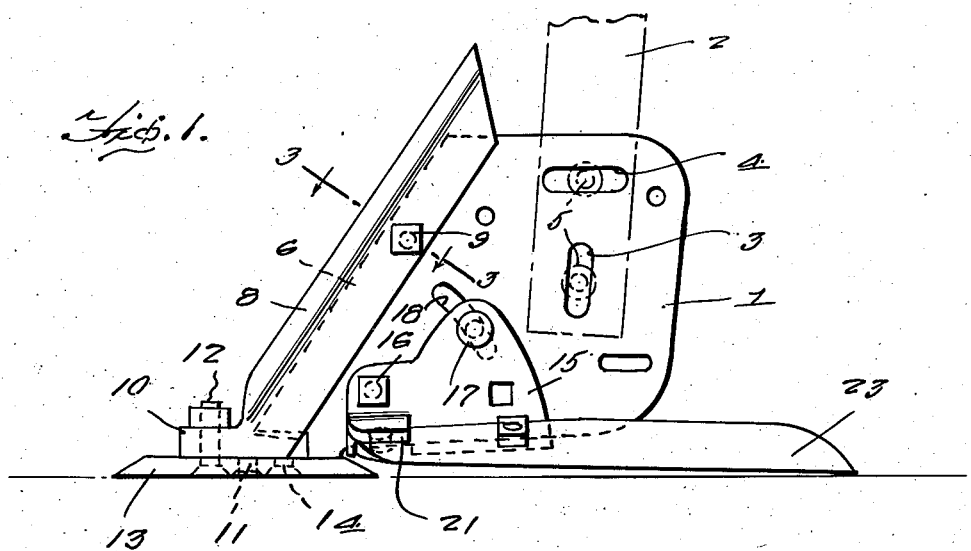
Figure 1 is a view in side elevation, showing the device ready for operation as a duck foot with a digger on the front thereof.
Figure 2:
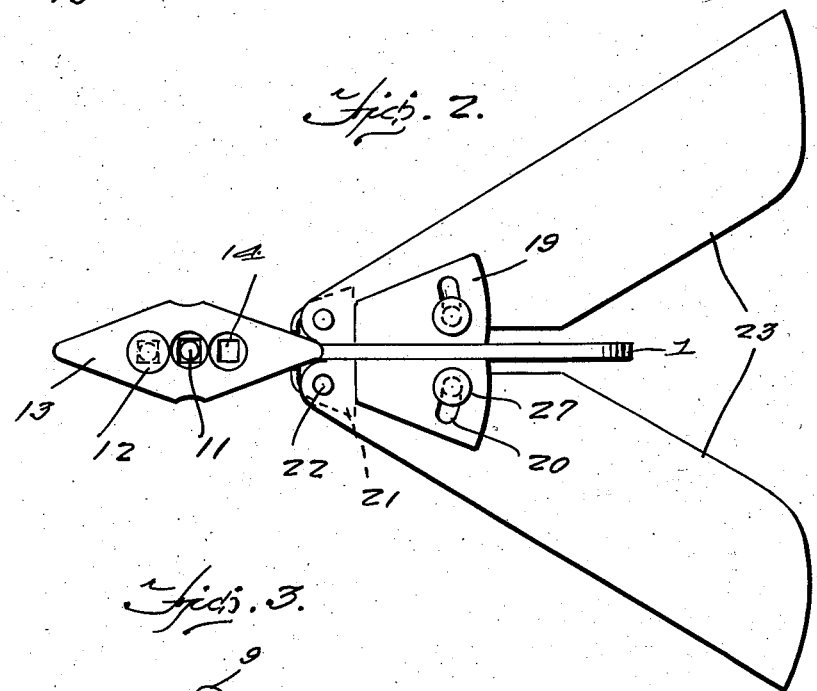
Figure 2 is a bottom plan view.

Referring to the drawings in detail, it will be seen that reference numeral 1 designates a plate of suitable metal which is mounted vertically on the lower end portion of a conventional cultivator shank 2. The plate 1 is capable of swinging adjustment in a vertical plane on the shank 2. Toward this end, the plate 1 has formed therein a vertical lower slot 3 and a substantially horizontal upper slot 4, said slots accommodating securing bolts 5. The plate 1 further includes a rearwardly inclined, tapered forward edge or marginal portion 6. The inclined forward marginal portion 6 of the plate 1 has formed therein a series of openings 7.

Figure 3:
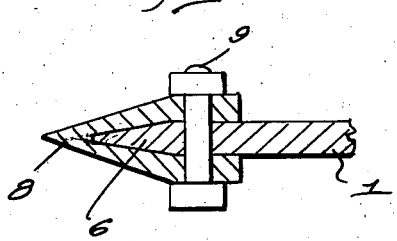
Figure 3 is a detail view in section, taken substantially on the line 3—3 of Figure 1.

Removably and adjustably mounted on the front portion of the plate 1 is a metallic digger 8. As illustrated to advantage in Figure 3 of the drawings, the digger 8 is substantially V-shaped in cross-section to accommodate the portion 6 of the plate 1. A bolt 9 secures the digger 8 on the plate 1, said bolt being insertible selectively in the openings 7. The digger 8 terminates, at its lower end, in a forwardly protruding apertured foot 10 from the rear portion of which a lug 11 depends. A bolt 12 removably secures a substantially diamond-shaped, reversible self-sharpening blade 13 beneath the foot 10. The blade 13 has formed therein a longitudinal series of three openings 14. The intermediate opening 14 accommodates the lug 11 while the bolt 12 is engageable in either of the end openings.

Mounted on the lower portion of the plate 1, at an intermediate point, is a pair of angular metallic brackets 15. Bolts 16 and 17 secure the brackets 15 on the plate 1 for swinging adjustment in a vertical plane. An arcuate slot 18 in the plate 1 accommodating the bolt 17, the brackets 15 pivoting on the bolt 16. As best seen in Figure 5 of the drawings, the brackets 15 include horizontally projecting flanges 19 having arcuate slots 20 in their rear portions. Forwardly of the flanges 19, the brackets 15 further include ears 21. The ears 21 are located above the horizontal plane of the flanges 19 and depending from said ears are pins or the like 22.

Self-sharpening sweeps 23 are mounted for swinging adjustment on the brackets 15. The sweeps 23 include beveled forward end portions 24 having eyes 25 thereon for receiving the pins 22 beneath the ears 21, said sweeps resting on the flanges 19. Openings 26 are provided in the forward portions of the sweeps 23 for the reception of bolts 27 for securing said sweeps in adjusted position, said bolts passing through the slots 20.

Figure 7:
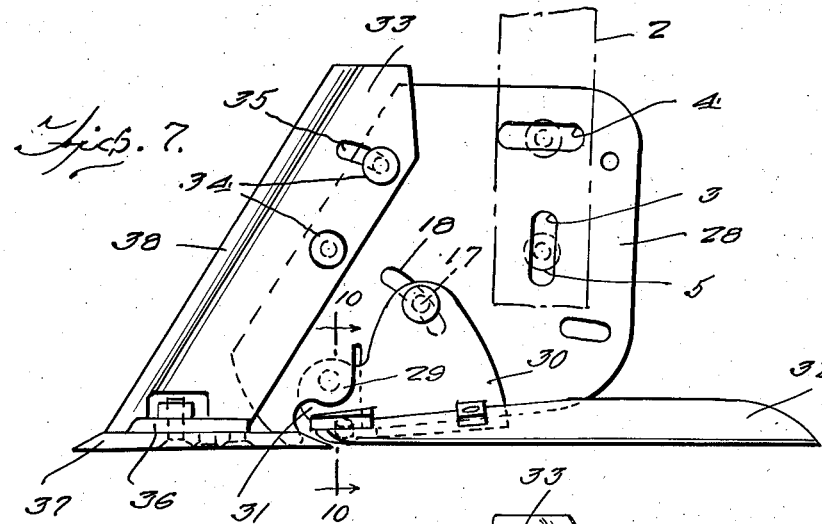
Figure 7 is a view in side elevation, showing an arrangement which is particularly adapted for cutting weeds up close to the plants.
Figure 8:
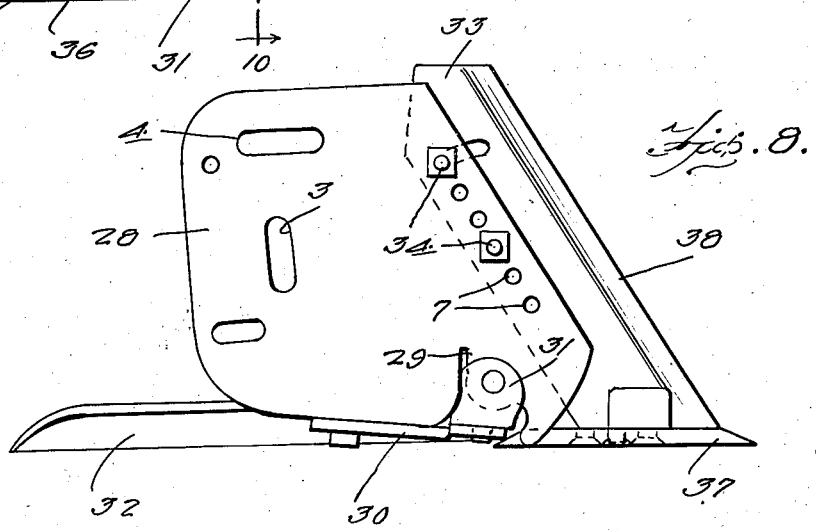
Figure 8 is an elevational view, looking at the opposite side of the embodiment shown in Figure 7.
Figure 9:
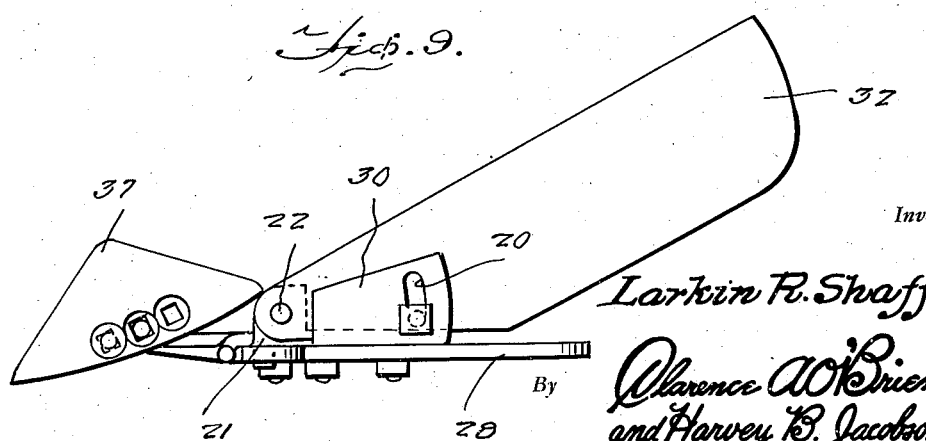
Figure 9 is a bottom plan view of the embodiment of Figures 7 and 8.

In Figures 7, 8 and 9 of the drawings, reference numeral 28 designates a plate to be mounted on the cultivator shank. The lower, front portion of the plate 28 is formed to provide a laterally pressed apertured ear 29. Pivotally mounted for swinging adjustment in a vertical plane on the ear 29 adjacent one side of the plate 28 is a bracket 30. It will be noted that the bracket 30 is operable on one side of the plate 28. The bracket 30 includes an apertured ear 31 which extends adjacent the opposite side of the ear 29.

In other respects, the members 28 and 30 are substantially similar in construction and operation to the members 1 and 15. A single sweep 32 is used in this embodiment of the invention, said sweep being mounted on the bracket 30.

Adjustably mounted on the front portion of the plate 28 is a cutter 33. Bolts 34 secure the cutter 33 in adjusted position on the plate 28. An arcuate slot 35 is provided in the upper portion of the cutter 33 for the reception of one of the bolts 34 for permitting pivotal adjustment of said cutter. A foot 36 projects laterally from the lower end of the cutter 33. Removably mounted beneath the foot 36 is a reversible, self-sharpening knife 37. The knife 37 is secured in position in a manner substantially similar to the knife 13. The front marginal portion of the knife 33, which terminates in the cutting edge is curved slightly toward the plants, as at 38.

In the embodiment shown in Figures 11, 12 and 13, of the drawings, reference numeral 39 designates a crust cutting knife which is adjustably mounted on the front portion of the plate 1 and which projects forwardly therefrom. The cutter 39 includes a rearwardly extending attaching arm 40 which is adjustably secured by bolts 41 to the plate 1. An arcuate slot 42 in the arm 40 accommodates one of the bolts 41 for permitting swinging adjustment of the cutter 39. A foot 43 projects laterally from the lower end of the cutter 39. Removably and adjustably secured beneath the foot 43 and projecting laterally therefrom is a reversible self-sharpening knife 44. The knife 44 is also secured in position in a manner substantially similar to the knife 13. In this embodiment, a single sweep is used. It will be noted that this single sweep and the knife 44 are located on the same side of the plate 1. The knife 44 is substantially diamond-shaped, but the outer edges only thereof are sharpened.

An important time, labor and material saving feature in these tools is made possible by means of inverting the detachable cutting blades and digger points, making them self-sharpening. If worn out, new blades and points can be purchased and replaced as shown without purchasing the complete tool.

It is believed that the many advantages of a cultivator embodying the present invention will be readily understood, and although preferred embodiments are as illustrated and described, it is to be understood that further modifications and changes in the details of construction and in the combination and arrangement of parts may be resorted to which will fall within the scope of the invention as claimed.

What is claimed is:

1. An agricultural tool of the character described comprising a plate for vertical mounting on a cultivator shank, a pivoted bracket mounted longitudinally on the plate for swinging adjustment in a vertical plane, said bracket including a laterally projecting flange on its lower portion, a pin depending from the bracket in front of said flange, a sweep journaled at its forward end on the pin and extending rearwardly from the latter across and resting on the flange, and means for securing the sweep in adjusted position on said flange.

2. An agricultural tool of the character described comprising a plate for vertical mounting on a cultivator shank, a bracket pivotally mounted for swinging adjustment in a vertical plane on said plate, said bracket including a laterally projecting flange on its lower portion and further including a laterally projecting ear forwardly of and above the horizontal plane of said flange, a pin depending from the ear, a sweep journaled on the pin and resting on the flange, and a bolt securing the sweep in adjusted position on the flange, said flange having a slot therein accommodating the bolt.

3. A cultivator tool comprising a vertical plate for mounting on a shank, said plate having a laterally pressed ear formed integrally therewith, a bracket mounted for swinging adjustment on one side of the plate, said bracket including an ear pivotally connected to the first-named ear on the opposite side thereof, said bracket further including a horizontally projecting flange on its lower portion, and still further including a horizontally projecting ear above the horizontal plane of said flange, a pin depending from the second-named ear, a sweep journaled for swinging movement on the pin, and means for securing said sweep in adjusted position on the flange.

4. A cultivator tool comprising a plate for mounting on a shank, said plate including an inclined, tapered forward edge, a digger of substantially V-shaped cross-section mounted on the forward portion of the plate, a horizontal apertured foot on the lower end of said digger, and a reversible knife removably mounted beneath said foot.

5. A cultivator tool comprising a plate for mounting vertically on a cultivator shank, said plate including a substantially tapered, rearwardly inclined forward end portion, a digger of substantially V-shaped cross-section removably mounted on said forward end portion of the plate, said digger made adjustable for deep or shallow digging by means of holes in the front edge of said plate, an apertured foot projecting forwardly from the lower end of the digger, a lug depending from said foot, and a reversible knife removably mounted beneath the foot, said knife having a series of openings therein, one of the openings for the reception of the lug, the other openings for receiving a securing element which is selectively insertible therein.

6. A cultivator tool comprising a vertical plate for mounting on a cultivator shank, a knife mounted at an inclination on the forward portion of the plate, said knife including a laterally curved cutting edge portion, a horizontal apertured laterally projecting foot on the lower end of the knife, and a reversible cutter removably mounted beneath said foot.

7. A cultivator tool of the character described comprising a vertical plate for mounting on a cultivator shank, a cutter mounted vertically on the front portion of the plate, said cutter including a rearwardly extending arm secured to the plate, a horizontal apertured laterally projecting foot on the lower end of the cutter, and a reversible knife removably secured beneath said foot.

8. A cultivator tool comprising a plate for mounting on a shank, said plate including an inclined tapered forward edge, a digger of substantially V-shaped cross section mounted on the forward portion of the plate, a horizontal apertured foot on the lower end of said digger, and a knife removably mounted beneath said foot.

LARKIN R. SHAFFER.